Jan. 1, 1963  H. HASTRUP  3,070,924
REMOTE CONTROL SYSTEM FOR FLUID ACTUATED MECHANISM
Filed Feb. 4, 1958  8 Sheets-Sheet 1

INVENTOR.
Herman Hastrup
BY
ATTORNEY

Jan. 1, 1963 H. HASTRUP 3,070,924
REMOTE CONTROL SYSTEM FOR FLUID ACTUATED MECHANISM
Filed Feb. 4, 1958 8 Sheets-Sheet 3
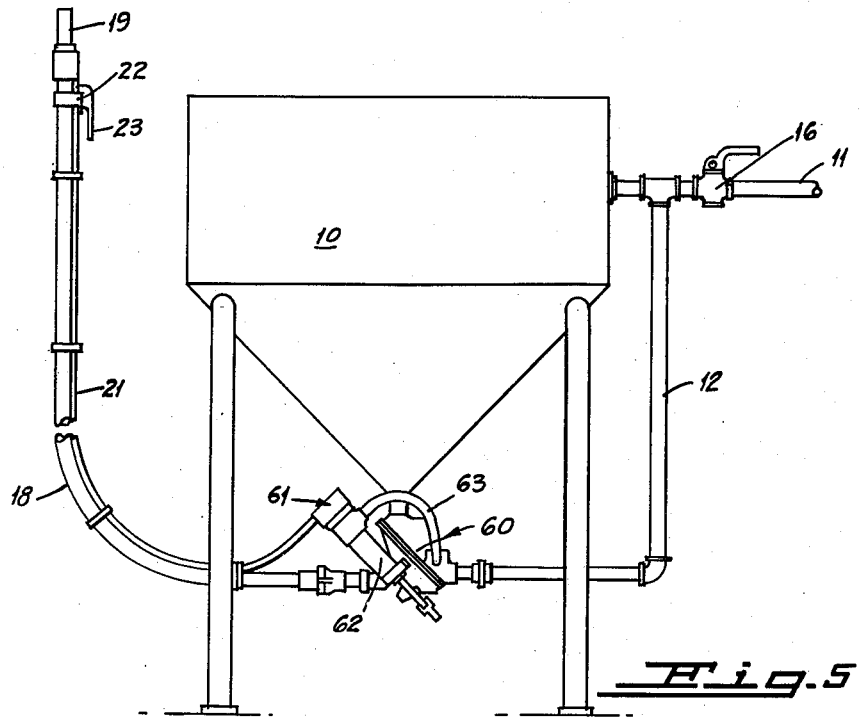
INVENTOR.
Herman Hastrup
BY
ATTORNEY

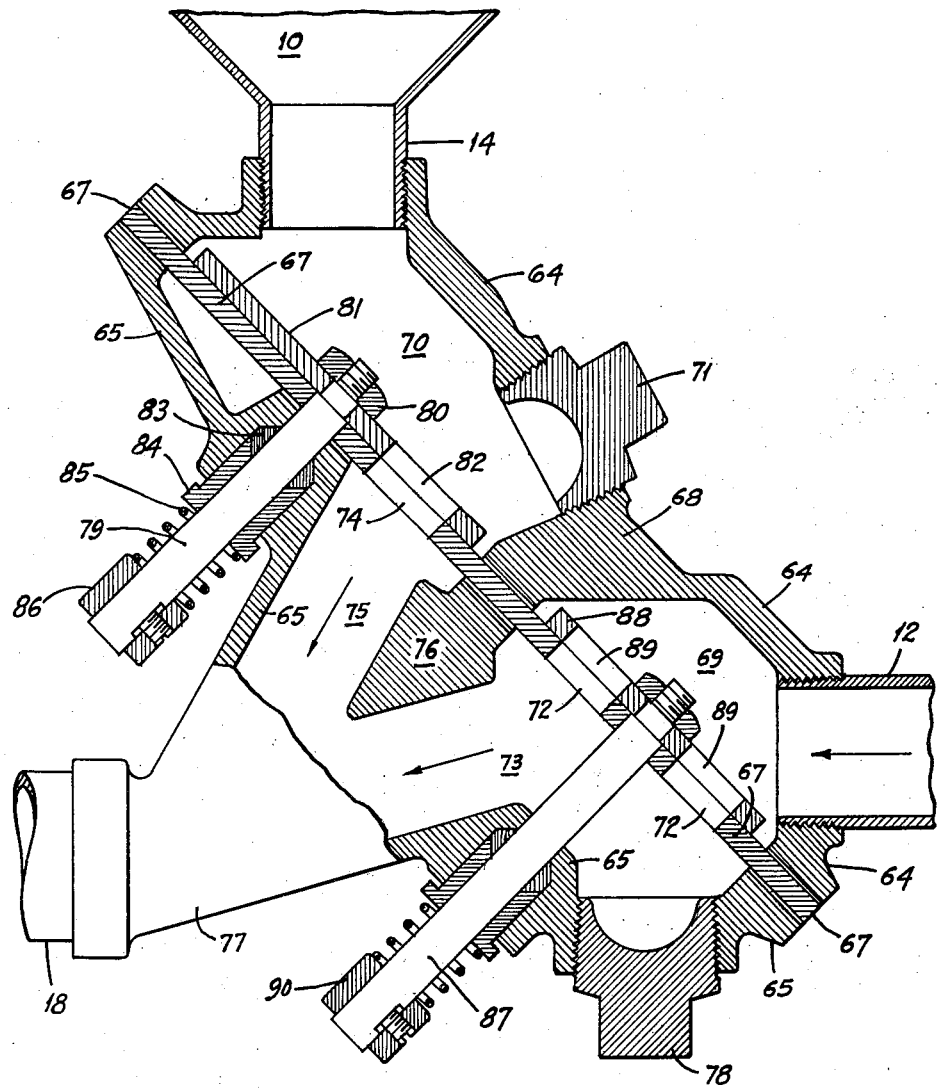

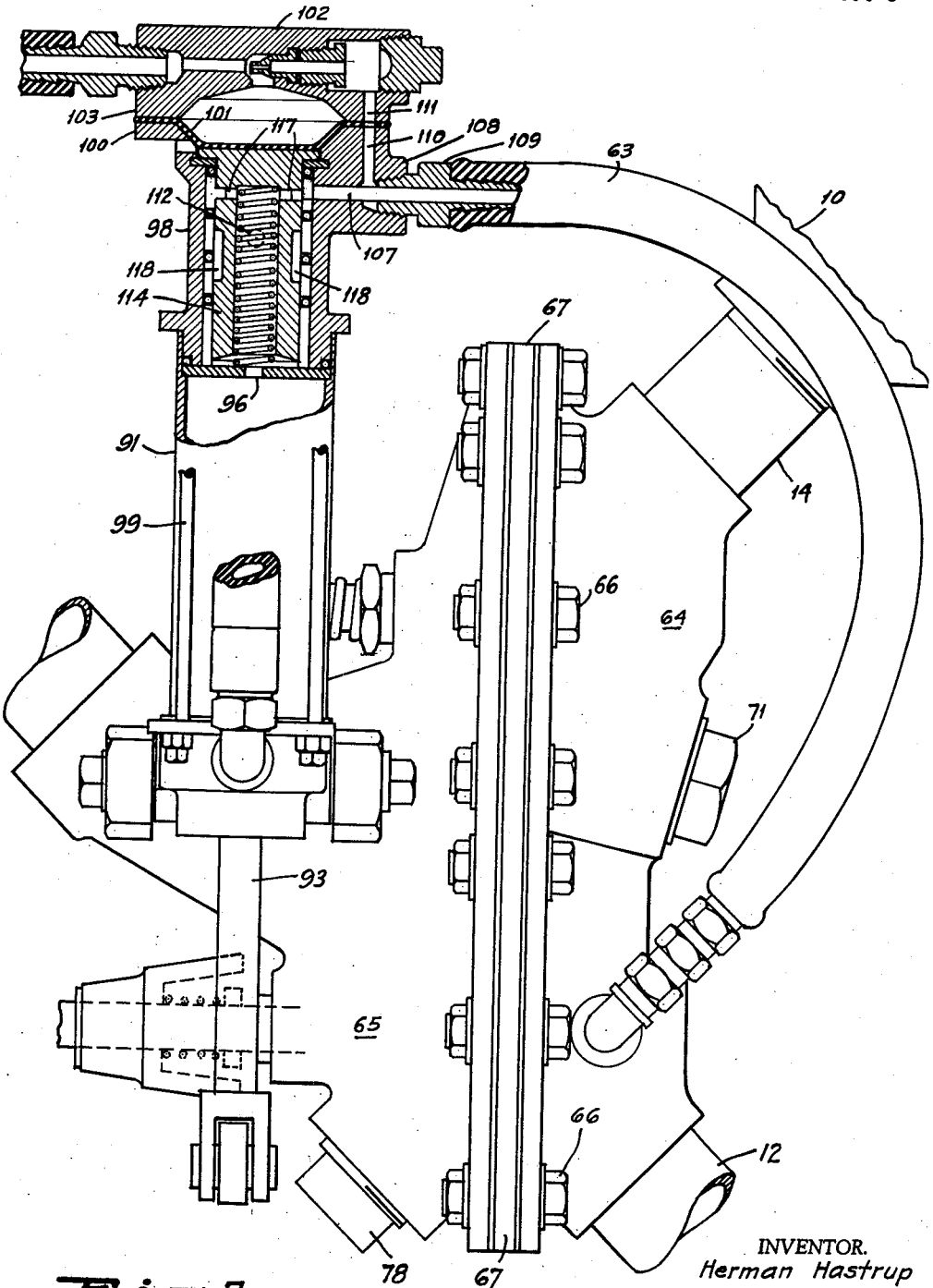

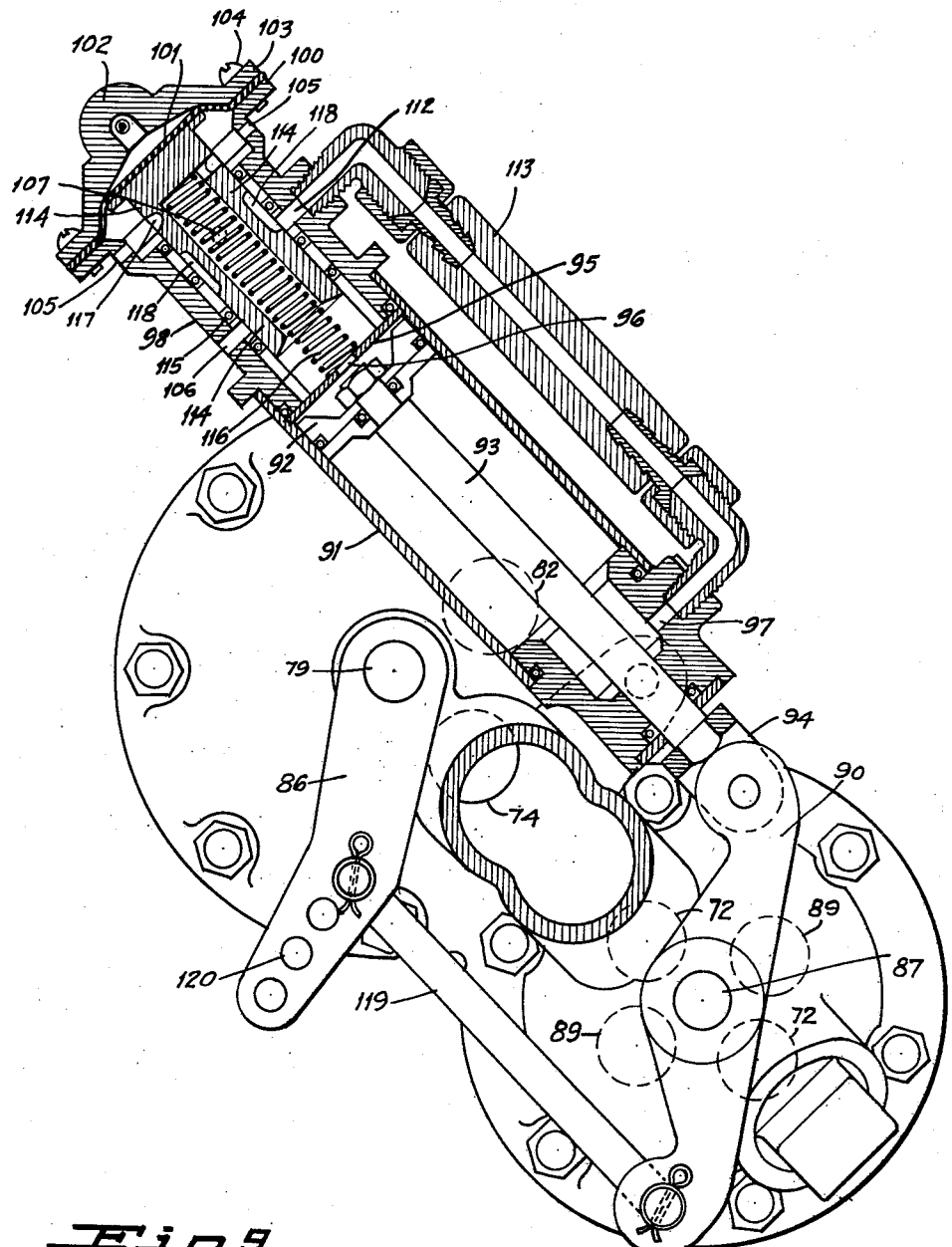

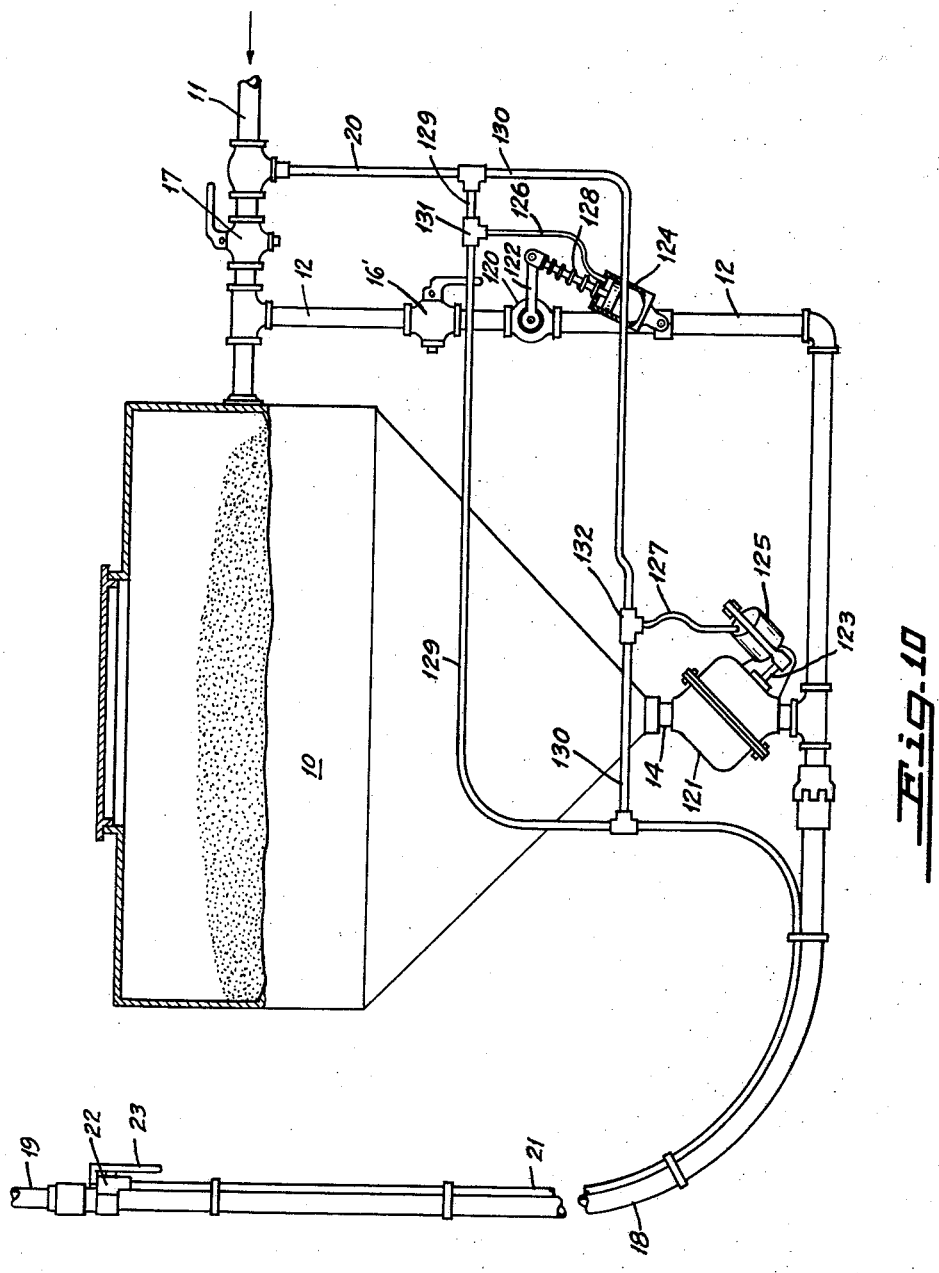

3,070,924
REMOTE CONTROL SYSTEM FOR FLUID
ACTUATED MECHANISM
Herman Hastrup, 44—226 Malae Place,
Keneohe, Oahu, Hawaii
Filed Feb. 4, 1958, Ser. No. 713,200
8 Claims. (Cl. 51—8)

The invention described herein may be made and used by or for the Government of the United States of America for governmental purposes without the payment of any royalties thereon or therefor.

This invention relates to a system and apparatus for the remote control of fluid actuated mechanisms used to trigger and control mechanical motion or the activation of mechanisms. It involves an element movable to one position by an increase in fluid pressure and to another position by a decrease in fluid pressure, utilizing in connection therewith a jet eductor.

Such triggering and control mechanism has many applications. Included among them is the operation of any type of valve through mechanical linkage or otherwise.

A typical embodiment of the invention comprises a system and apparatus for the control of sand blasting, guniting of cement and the like wherein abrasive or other coarse material is conveyed in a stream of compressed air through a flexible and portable hose and discharged at high velocity from the nozzle end of such hose.

In operations of this nature the length of hose from the nozzle or discharge end back to the equipment where the mixture of abrasive or other material and air is produced is often of very great distance and may sometimes reach several hundred feet particularly when blast cleaning is performed in locations such as ships compartments of large shipyards. Because of the weight involved, the portability of the hose and nozzle, which must be carried by the operator, and the abrasive action of the mixture, particularly on metal parts, it is impracticable to have a valve on the discharge hose at or near the nozzle outlet for starting and shutting off the blast stream. Such valves are generally located in the equipment where the blast mixture is produced. They are not usually hand-operated. Instead, a remote control system is provided to enable the operator stationed at or near the nozzle end of the blast stream hose to bring about the starting and the stopping of the blast stream. Since compressed air is already available at the equipment it is common practice to use an air-operated remote control system for opening and closing the air blast valve and the abrasive blast valves. Such systems generally involve an auxiliary compressed air line of small diameter, called the control line, which generally leads off from the main compressed air line at the mixing equipment and extends alongside the blast hose to near the end thereof. Associated with this control line, either branching therefrom or from the main compressed air line is a small air line which communicates with the diaphragm chambers of the valves in the air blast line and the abrasive line, or, in the case said valves are piston operated, to the air cylinders for such pistons. On the end of this control line is the operator's control valve which usually has a spring-controlled hand lever which the operator can press against the control air hose as he holds the blast hose nozzle to direct the blast stream in the desired direction. When the operator releases the pressure on the hand lever the spring moves the lever outwardly away from the control hose. Because of the possibility that this small air control hose may become severed by mechanical injury, such as by being run over by a truck, or may otherwise become ruptured causing a flow of air through the hose to the atmosphere at the point of rupture, the arrangement of the lever on the said operator's control air line valve is such that whenever the lever is not held pressed against the control hose, the valve is always open, with air flowing out through the end of the control hose; the arrangement also being such that the flow of air outwardly through this control line always brings about the closing of the air blast valve and the abrasive blast valve at the mixing equipment and thus stopping the blast stream. Conversely, when the operator's control valve is closed to stop the flow of air through the control hose (i.e., with the hand lever pressed against the side of the control hose) there is brought about the opening of the valves on the air blast line and the abrasive blast line and the starting of the blast stream. In other words, when air is flowing from the control hose there is no blast stream operation; and when there is no air flow through the control line the blast stream is operating. Thus, if the operator should accidentally drop the blast hose nozzle or otherwise lose control of it and the control hose, the blast stream stops. This arrangement is important because of the deadly danger that could arise from an uncontrolled blast stream and a "whipping" blast hose.

As is implied in the foregoing description, it is an inherent feature of such remote control systems that the actuating of the mechanism which opens the valves in the air blast and abrasive blast lines to start the blast stream and to keep the blast stream in operation is dependent upon the back pressure that is built up in the control system when the operator closes the control valve at the end of the control line. More important still, it is inherent that the actuating of this mechanism to close these valves to stop the blast stream is dependent upon decreasing the pressure in the control system on or at the vicinity of said actuating mechanism appreciably below the back pressure that had been sustained thereon or thereat when the blast stream was operating. In the practice heretofore this decrease in pressure is in turn dependent upon the starting of a substantial air flow in or at said vicinity. Significantly, the friction in the long length of very small air control line (one-fourth inch or thereabouts) and the further restrictions in flow caused by the fittings in the line are sufficient to preserve enough of the built up back pressure in this vicinity of the system to delay for a considerable length of time after the operator has released his hand pressure and opened the valve on the end of his control line, the actuating of the mechanism to close the valves and stop the blast stream. The delay is sometimes referred to as the time required for a sufficient "bleeding" off through the long control line of the back pressure air. This time lag is sometimes as much as one-half minute. In those instances where the operator, by accident or through incapacitation, loses control of the blast hose and control line this time lag could easily result in serious consequences from the uncontrolled blast stream and a most likely "whipping" blast hose.

It is an object of this invention to provide an air-operated remote control system for closing the valves in the blast air supply line and sand supply line in sand blasting and similar operations which is without dependence upon the bleeding out through the long air control line of most or a substantial part of the air pressure that has necessarily built up in said control line prior to the closing of said valves—and thus eliminate the hazard of an uncontrolled blast hose that may be created during the long time lag required for such bleeding out of air pressure.

Another object is to overcome the sluggishness in the opening of the valves in the blast air and sand supply lines (which valves are generally air-diaphragm or air-piston operated) by providing for positive and uninterrupted release of air pressure from said diaphragms or pistons.

Another object is to reduce the consumption of compressed air in the operation of a remote control system for sand blasting and similar operations.

A still further object is to provide a blast valve manifold assembly wherein both the blast air supply valve and the abrasive blast supply valve are opened and closed by a single actuating means in an air-operated remote control system for a sand blasting and similar operation.

These and other objects and advantages of the invention will appear from the ensuing description and appended claims.

One form of the invention is illustrated by way of examples in the accompanying drawings and is described in detail hereinafter. The particular constructions herein shown and described are to be construed as illustrative only, and not as limiting the invention.

In the drawings:

FIGURE 5 shows diagrammatically a modified form of my remote control system in which the air blast valve and abrasive blast valve are combined into a single unit blast valve manifold, together with remote control assembly therefor.

FIGURE 6 is a longitudinal section through the blast valve manifold component of FIGURE 5.

FIGURE 7 is an enlargement of that part of the view in FIGURE 5 which shows the blast valve manifold unit and the eductor and control air cylinder for operating said unit, the control cylinder being partly in longitudinal section.

FIGURE 9 is a side view, partly in section, of the control air cylinder as shown in FIGURE 7, with the piston and levers for operating the discs of the blast valve manifold unit shown for the closed position of the valves in said unit.

FIGURE 10 shows diagrammatically a remote control system similar to that of FIGURE 1 but with the blast air supply valve and the abrasive blast supply valve, each of the piston operated disc type with control by separate eductors in lieu of the escape valve and single eductor in the system of FIGURE 1.

Figure 1:
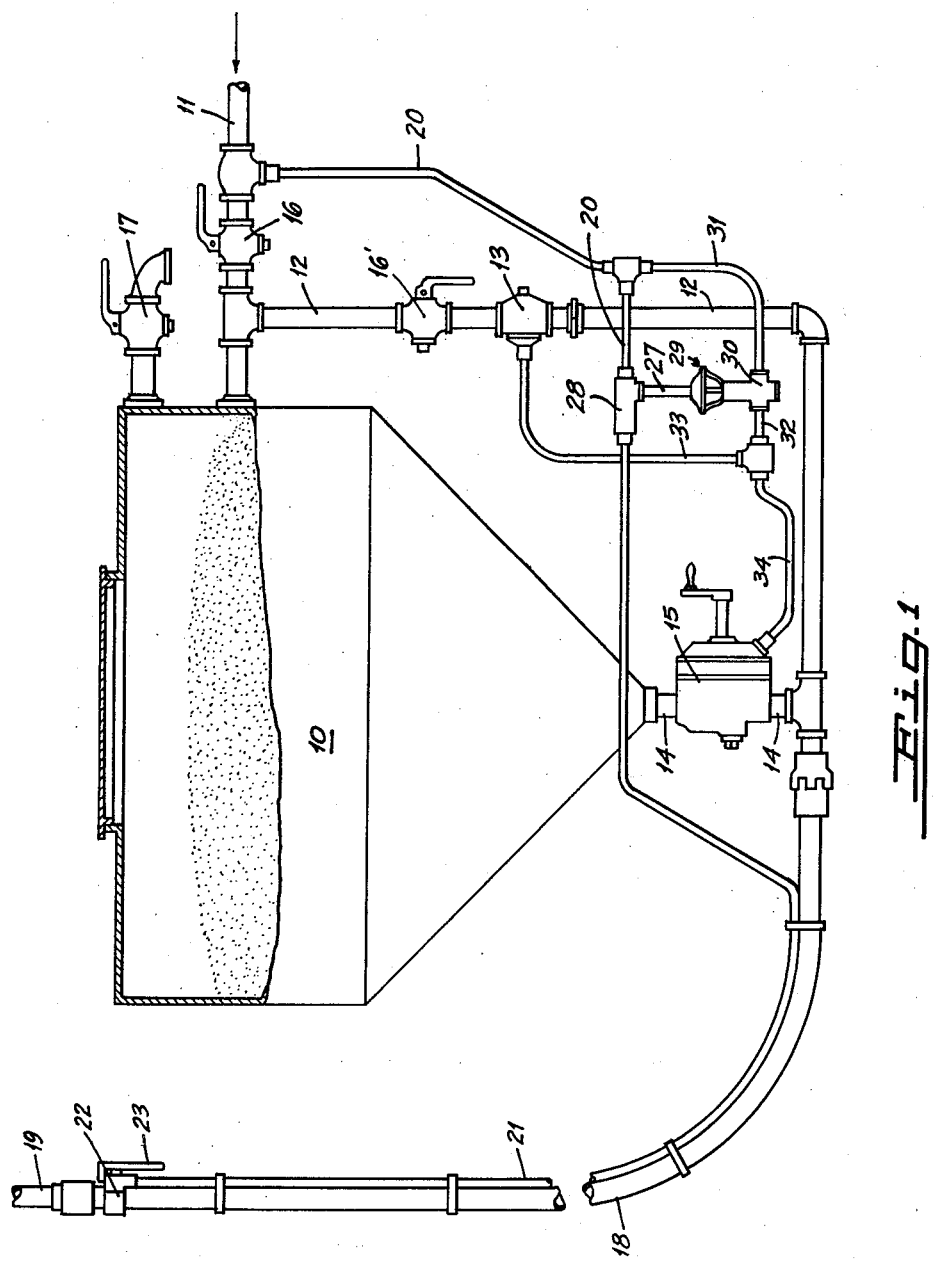
FIGURE 1 shows a remote control system of sand blasting operation embracing certain features of my invention, including an improved escape valve and an eductor for co-action therewith.

Referring to the drawings, and first to the system for sand blasting illustrated in FIGURE 1, a tank 10 of air tight construction and adapted to contain sand or other suitable abrasive, has leading into it a compressed air supply line 11 from which extends a main branch line 12 provided with an air blast valve 13, which latter valve is operated by the remote control system hereinafter described. The line 12 extends beneath tank 10 where it is joined by a line 14 from the bottom of said tank, said line being provided with an abrasive blast valve 15 which is also operated by the remote control system. Hand closure valves 16 and 16' are provided in lines 11 and 12 respectively, and another hand closure valve 17 is provided in tank 10. When the valves 13 and 15 are opened by the remote control system (hand-operated valves 16 and 16' being open and hand-operated valve 17 closed), abrasive flows through line 14 and is mixed with the blast air flowing in line 12 to form a blast stream of abrasive and air which flows through a blast hose 18 and is discharged at high velocity through a nozzle 19. The pipe fittings in lines 11 and 12, the coupling which joins the hose 18 to line 12, and other connecting fixtures are of conventional design.

In the remote control system by which the air blast valve 13 and the abrasive blast valve 15 are operated, a small air supply line 20 leads from the main compressed line 11 and is connected to and leads into a small operator's control hose 21 which extends generally along the blast hose 18 and terminates in proximity to the blast hose nozzle 19 in an operator's control valve 22 provided with a lever 23. An eductor 28 is installed in the control line 20 which leads into the control hose line 21, and connected to the suction zone, i.e., the zone of entrainment of said eductor, is the line 27 which communicates with the diaphragm chamber of a diaphragm operative mechanism designated generally as 29 which in turn operates a three-way valve, designated generally as 30. A line 31 branching from line 20 leads to the valve 30 and a line 32 leading from said valve branches into lines 33 and 34 which lead, respectively, to the diaphragm chambers of air blast valve 13 and abrasive blast valve 15. Both of these valves 13 and 14 being of the conventional diaphragm operated type so that when sufficient air pressure builds up in the diaphragm chamber the diaphragm is moved toward the valve seat to close the valve against the passage of air or of abrasive therethrough, as the case may be. The aforesaid lever 23 for the operator's control valve 22 is so arranged that when the operator presses the lever 23 against the side of the control hose 21 the valve 22 is thereby closed. This lever is also spring controlled so that when the operator releases his hand pressure on the lever the spring moves the lever outwardly from the control hose and opens the said control valve. Thus there is automatically a flow of compressed air through the control hose 21 and outwardly therefrom to the atmosphere whenever the lever 23 is released, the release being either voluntarily by the operator or when the operator by accident or incapacitation loses control of the blast hose and the said control hose. Conversely, the flow of air through the control hose 21 is stopped only by a manual movement of the lever 23 against the control hose 21. The valves 13 and 15 are of conventional diaphragm operated type for services of this nature. They are generally provided with a greater area of working surface of the flexible diaphragm structure on the diaphragm-chamber side against which pressure is exerted to move the diaphragm toward the valve seat to close the valve than on the valve-seat side. This is in order to assure a positive action in the closing of the valve, since the valve has to close against the blast pressure on the other side of the diaphragm structure. Valve 15 is provided with a handle for moving a control stem in the valve against the diaphragm structure to close the valve, or to assure its remaining closed, when the operation is shut down for any extended period of time, this to assure that sand or other abrasive may not work down into the line 12 when the plant is shut down and interfere with the starting of the operation.

The eductor 28, the diaphragm operating mechanism 29 and the three way valve 30 of the system shown in FIGURE 2 will now be described.

Figure 2:
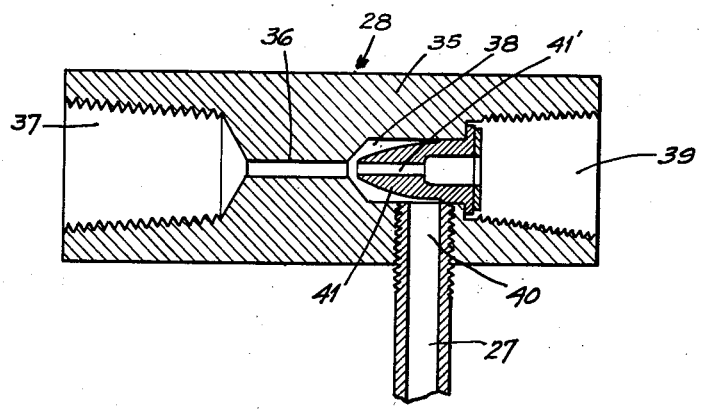
FIGURE 2 is a longitudinal section through one form of eductor used in my control system.
Figures 3, 4:
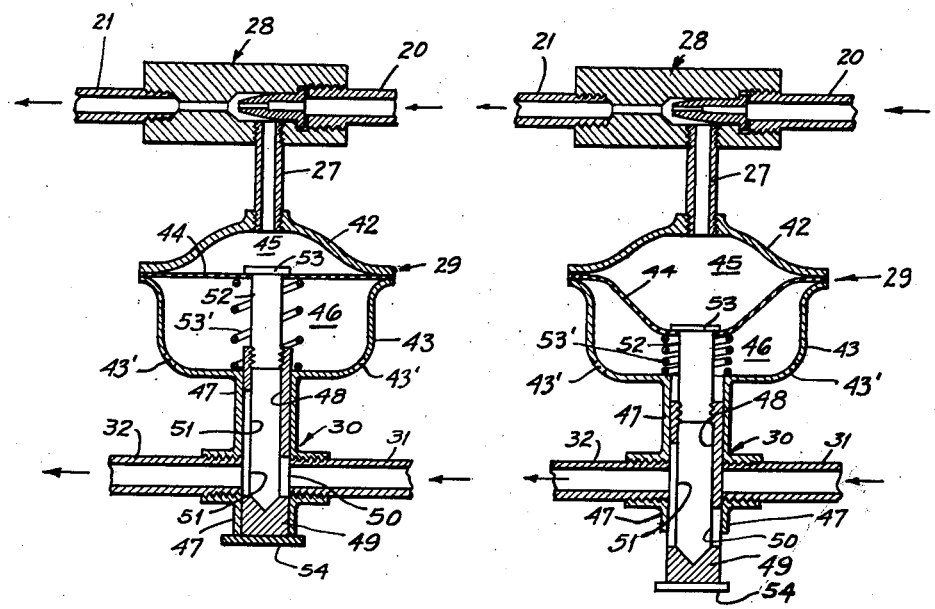
FIGURE 3 is a longitudinal sectional view, partly diagrammatic, of the eductor and escape valve of FIGURE 1, with the ports of the escape valve in position to permit escape of air from behind the diaphragms of the valves in the abrasive and the blast air supply lines in FIGURE 1.
FIGURE 4 shows the same escape valve and eductor of FIGURE 4 but with the ports of the escape valve in position to cut off the escape of air from behind the diaphragms of the valves in the abrasive and blast air supply lines and to permit air to be supplied to the diaphragms of said valves.

Referring to FIGURE 2, a block 35 constitutes the body of the eductor and has an eductor tube 36 which is a longitudinal axial bore of very small diameter, preferably of only about one-sixteenth inch and about one-half inch in length, which opens into the forward bore 37 adapted to threadedly receive a small pipe (generally about a quarter inch pipe) which leads into or becomes the control hose line 21, seen in FIGURE 1, also in FIGURES 3 and 4.

In a larger bore 38 leading rearwardly from the eductor tube 36, there is positioned a jet member 41 provided with an axial bore, the forward portion 41' of which constitutes what is known as the eductor jet and which is of only about one thirty-second inch in diameter or about one-half that of the eductor tube 36. The said jet member 41 is tapered at its forward end so as to provide a space in the bore 38 forwardly of the end of the member 41 and surrounding said tapered portion, which said space constitutes the zone of entrainment of the eductor and communicates with radial bore 40 which is adapted to threadedly receive a small pipe 27 leading to the diaphragm actuating mechanism shown in FIGURES 4 and 5. The rearward bore 39 is adapted to threadedly receive the compressed air control supply line 20 (FIGURE 1 and FIGURES 3 and 4).

Attention is called to the fact that the use to which the eductor is put in my control system differs materially from that to which eductors are commonly put. Eductors are commonly used for the purpose of moving large quantities of air by the use of a high velocity primary air stream. To accommodate such air movement the cross sectional area of the eductor tube corresponding to the bore 36 in my eductor is as much as sixty times as great as that of the eductor jet as compared with my ratio of 2 to 1. In my system one of the objects as noted hereinabove is to cut down materially on the amount of air that flows through and out of the control hose line 21 during the time that the blast stream is operating (i.e., during all the time the operator's control valve is open). I therefore use the eductor jet 41' as a restriction in the control line. Secondly, as will be noted in FIGURES 3 and 4 (later described in detail) the zone of entrainment of my eductor, through line 27, is in communication with a small, enclosed space sealed air tight, one boundary wall of which space is a movable diaphragm 44. In this sealed space I desire to create as nearly complete a vacuum as is practicable and there is no large volume of air to be removed as commonly found in the use of eductors—in fact none to speak of since the space above the diaphragm is very small. This second feature is even more important than the first and distinguishes my eductor from those commonly used. The formulas for eductor pumps shown in handbooks and technical publications all pertain to eductors used for moving either air or liquid from one place to another. They do not apply to maintaining a vacuum in an air-tight compartment. The dimensions given above for my eductor jet bore (41') and my eductor tube bore (36) are preferred when the primary air pressure used ranges between 80 and 100 pounds per square inch. This gives an eductor tube diameter twice the diameter of the eductor jet bore, with the length of the eductor tube eight times the diameter of the eductor tube. If the air pressure used for the primary air flow (in line 20) is less than 80 pounds the eductor tube (36) should be shorter, and conversely if the pressure is higher than 100 lbs. it should be longer, since the cone formed by the air discharging from the eductor jet must fill the outer opening of the eductor tube. The higher the velocity of the escaping air through the jet the smaller is the angle of this "cone" with the center line of the flow. Thus for good design a longer eductor tube is needed when the velocity is increased.

Referring to the three way valve of the system of FIGURE 1, shown in longitudinal cross section in FIGURES 3 and 4 and there designated generally as 30, and to the diaphragm mechanism for operating it, also shown in FIGURES 3 and 4 and there designated generally as 29, an upper housing 42, somewhat saucer-shaped and provided with an axial opening threaded to take the pipe 27 which communicates with the eductor 28, is secured at its periphery by any suitable means, not shown, to the peripheral edge of a cup-shaped lower housing 43, the concave portions of the two housings facing each other. A flexible diaphragm 44, made of rubber or other suitable resilient material, is securely held between the said two housings at their peripheral contacts and thus divides the space enclosed by the two housings into an upper chamber 45 and a lower chamber 46. The upper chamber 45 is air tight, the only communication therewith being through pipe 27 which leads to the suction zone of eductor 28. Openings 43' are provided through the wall of lower housing 43 so as to put the lower chamber 46 in communication with the outside atmosphere. The lower part of the lower housing 43 is formed into a hollow cylindrical stem 47 which communicates with the chamber 46 and is open at its lower end, said stem being formed with two oppositely positioned hollow radial projections each threaded to take a small pipe, one the aforesaid line 31 and the other the aforesaid line 32 shown in FIGURE 1. Provision thus exists for an open passageway from line 31 across the hollow stem 47 to line 32 unless such passageway is obstructed or cut off by some additional object. Slidably fitting inside hollow stem 47 is a hollow cylindrical valve port member 48 closed at it lower end 49. In the wall of said valve port member 48 is an opening or port 50 positioned in proximity to the end closure 49 and adapted to be in engagement with the passageway into hollow stem 47 from pipe line 31 by an axial sliding movement of said valve port member within said hollow stem, such engagement being shown in FIGURE 4. The area of said port 50 is approximately that of the said passageway from line 31. Also in the wall of valve port member 48 diametrically opposite from port 50 is an elongated port 51, the lower portion of which is on a level with port 50 whereby when port 50 is in engagement with line 31 this lower portion of port 51 is in engagement with the passageway into line 32, as also seen in FIGURE 4. The length of port 51 is such that when the valve port member 48 is moved axially downwardly to a position where port 50 is completely out of engagement with the passageway from line 31, and also far enough downwardly that port 50 and the lower portion of port 51, or at least the greater areas thereof, are below the lower end of hollow stem 47, the said port 51 is still in engagement with the passageway into line 32, as shown in FIGURE 3. A rod 52 is secured to the upper end of valve port member 48, by threaded engagement therewith or other suitable means. The upper end of rod 52 terminates in a flat cap member or plate 53 which is secured to diaphragm 44 by any suitable means. A coiled spring 53' positioned around rod 52 has its lower end anchored to the housing 43 and its upper end to diaphragm 44 so as to be in compression when the diaphragm is depressed as shown in FIGURE 3. A member 54, which may be a bar or disc or other suitable body, is secured across the lower end of valve port member 48 and by making contact with the lower end of hollow stem member 47, as in FIGURE 4, is adapted to stop the upward movement of the said valve port member 48 at a point where port 50 is in engagement with the passageway from line 31. The lengths of rod 52, valve port member 48 and hollow stem 47 in relation to each other are such that with the valve ports in position as shown in FIGURE 4 the diaphragm 44 may be in its normal unflexed status.

The operation of the eductor 28 and the three way valve 30 for the remote control system as shown in FIGURE 2 is as follows. With no blast stream flowing from the discharge nozzle 19 the operator's control valve 22 is open so that air is flowing through the control line 21. With this status the eductor 28 has created a reduced pressure in line 27 and air-tight chamber 45 so that the diaphragm 44 has moved the valve ports 50 and 51 into engagement respectively with lines 31 and 32 as shown in FIGURE 4, thus permitting pressure to be transmitted from line 31 through line 32 and branches 33 and 34 (FIGURE 1) against the diaphragms in the air blast valve 13 and abrasive blast valve 15 (FIGURE 1) whereupon these valves, pursuant to the manner in which they are conventionally designed as hereinbefore explained, are held closed. To start the blast stream the operator presses lever 23 against control hose 21 to close control valve 22, whereupon the back-up of pressure through line 21, eductor 28 and line 27 forces diaphragm 44 downwardly to the position shown in FIGURE 3, which in turn, by the downward sliding movement of valve port member 48 moves valve port 50 out of engagement with line 31 to close off said line, and moves elongated valve port 51 downwardly so that very substantial areas of both ports 51 and 50 are open to the atmosphere, thus bringing line 32 into communication with the outside atmosphere. This immediately releases the pressure in the diaphragm chambers of air blast valve 13 and abrasive blast valve 15, so that these valves are opened and the blast stream is put into operation. To stop the blast stream the lever 23 is released to open valve 22 and permit air flow to start in control line 21. At this moment, because of the very appreciable period of time (one-half minute in some instances) required for the "bleeding out" of the built-up pressure in the long control line 21, there occurs only a small increment of lowering of pressure in chamber 45 against the diaphragm 44—much too small an increment to be effective in moving the diaphragm and the valve port mechanism of the three way valve 30. Such small increment of lowered pressure is sufficient, however, to permit, almost instantly, a very minute amount of primary air flow from line 20 through the exceedingly small ejector jet bore 41 of my eductor, enough to reduce the pressure in chamber 45 against diaphragm 44 by an amount that may approach 15 pounds. This in turn in coaction with spring 53' which is of selected strength to furnish a balance between the reduced pressure provided by the eductor and the primary air pressure, and with the resiliency of the diaphragm, serves to actuate the diaphragm and valve port mechanism of the three way valve 30 for the immediate closing of the air blast and abrasive blast valves and stop the blast stream as explained in the first part of this paragraph.

It will thus be seen that with my eductor system I effect substantially instantaneously the closing of the blast valves so that it is not necessary to endure the long time-lag that has heretofore been required after the operator's control valve is closed. Thus, in case of accidental loss of control by the operator there is almost instantaneous stopping of the blast stream as against the danger, sometimes for as long as half a minute, of a wild blast stream from a whipping blast hose as heretofore. Additionally, there is an appreciable saving of compressed air used in the control system. Even though the control line is only of about one-quarter inch size, in the system as heretofore practiced, this line runs with the full pressure of the source of compressed air whenever the blast stream is stopped, as in shifting from one position to another and the like; whereas, with the eductor, as in the system of FIGURE 1, the only quantity of air which flows through the control line 21 is the very small amount which passes through the small bore 41' of the eductor, and the quantity of air flowing out from line 21 when the operator's control valve 22 is open can scarcely be perceived.

It will also be noted with my eductor and three way valve control that by reason of the fact that when the blast stream is started, and during the entire time it is operating, the air line 31 which supplies the air to the diaphragm chambers of the air blast valve and abrasive blast valve is completely cut off whereas prior art systems have employed an escape valve such that this air supply is not interrupted but continues to exert some pressure to counteract to some degree the air escaping through said escape valve from the diaphragm chambers of the blast stream valves, there is a two-fold advantage with my eductor control system, namely, the sluggishness in the opening of the blast stream valves is overcome and the wasting loss of compressed air from the supply line to the control system during the entire time that the blast stream is operating is eliminated.

The modified form of my remote control system in which the air blast valve and abrasive blast valve are combined into a single unit blast valve manifold with an eductor and control air cylinder for operating said manifold unit will now be described. In the assembly shown in FIGURE 5, the abrasive tank 10, the main compressed air lines 11 and 12, hand operated valve 16, abrasive blast hose 18, blast nozzle 19, operator's control hose 21, operator's control valve 22 with its manually controlled lever 23 are all essentially the same as in the foregoing descriptions for the systems of FIGURE 1, the tank 10 being shown only diagrammatically and with certain contentional appurtenances thereof not shown. The blast valve manifold is designated generally as 60, the eductor as 61 and the control air cylinder as 62. The valves in the blast valve manifold unit are disc valves, with the discs operated by levers connected to the piston of the control air cylinder. A flexible compressed air hose 63 leading from within the air chamber of the blast valve manifold unit conveys air to both a valve mechanism for control of the air cylinder 62 and the eductor 61. The eductor discharges into the operator's control hose 21 and the blast valve manifold unit discharges a blast stream of air and abrasive into the blast hose 18.

Turning now to a detailed description, and first to that of the blast valve manifold, a valve cover housing 64 and a valve body housing 65 (FIGURES 6 and 7) are secured by bolts 66 to the upper and lower sides, respectively, of a valve plate 67, which plate is continuous all the way across the valve unit between the two said housings. The cover housing 64 is formed with a web partition element 68 (FIGURE 6) extending inwardly and terminating in a flat surface adapted to make a sealing contact against the plate 67, thus dividing the space enclosed by the upper housing and plate 67 into an air receiving chamber 69 and an abrasive receiving chamber 70. A threaded opening through the upper housing 64 into chamber 69 is adapted to receive compressed air line 12 as the air intake into said manifold unit and similarly another threaded opening through the upper housing into chamber 70 is adapted to receive abrasive line 14 from tank 10 as the abrasive intake into said manifold unit. A clean-out plug 71 is threadedly fitted in an opening through the housing leading into the abrasive receiving chamber 70. The valve plate 67 is provided with air valve port openings 72 therethrough from air receiving chamber 69 to the space 73 therebelow, and similarly with an abrasive valve port opening 74 from abrasive receiving chamber 70 to space 75 therebelow. Desirably, though not necessarily, there are two air ports 72 and one abrasive port 74. The lower housing 65 is provided with a web partition element 76 which separates the two spaces 73 and 75 and which has its upper edge adapted to sealably fit against plate 67, the said web partition member being also of relatively narrow vertical depth so that therebelow the two spaces 73 and 75 are joined. At this general level the housing 65 is formed into an outlet portion 77 through which air from the space 73 and abrasive from space 75 are mixed to form the abrasive blast stream, said outlet portion 77 being suitably connected to discharge conduit 18 which farther on becomes the aforesaid blast hose 18. A second clean-out plug 78 is threadedly fitted into an opening through the housing 65 leading into the space below valve plate 67.

An abrasive valve stem 79 rotatably mounted in an opening through housing 65 and rotatively fitted in an opening through valve plate 67 has secured thereto by a nut 80 an abrasive valve disc 81 provided with valve port 82 positioned for engagement with valve port 74 during rotation of said valve stem 79. Suitable valve packing seal 83 and bushing 84 against which compression spring 85 acts provides an air tight fitting for the valve stem 79, the spring 85 also serving to hold disc 81 firmly against valve plate 67. Rigidly mounted to the outer end of abrasive valve stem 79 is one end of blast valve lever 86 later to be described. In a similar manner blast-air valve stem 87, to which is secured blast-air valve disc 88 provided with valve ports 89 for engagement with valve ports 72, is rotatably fitted in another opening through housing 65 and valve plate 67 and has rigidly secured to its outer end the mid section of blast-air valve lever 90 later to be described.

Figure 8:
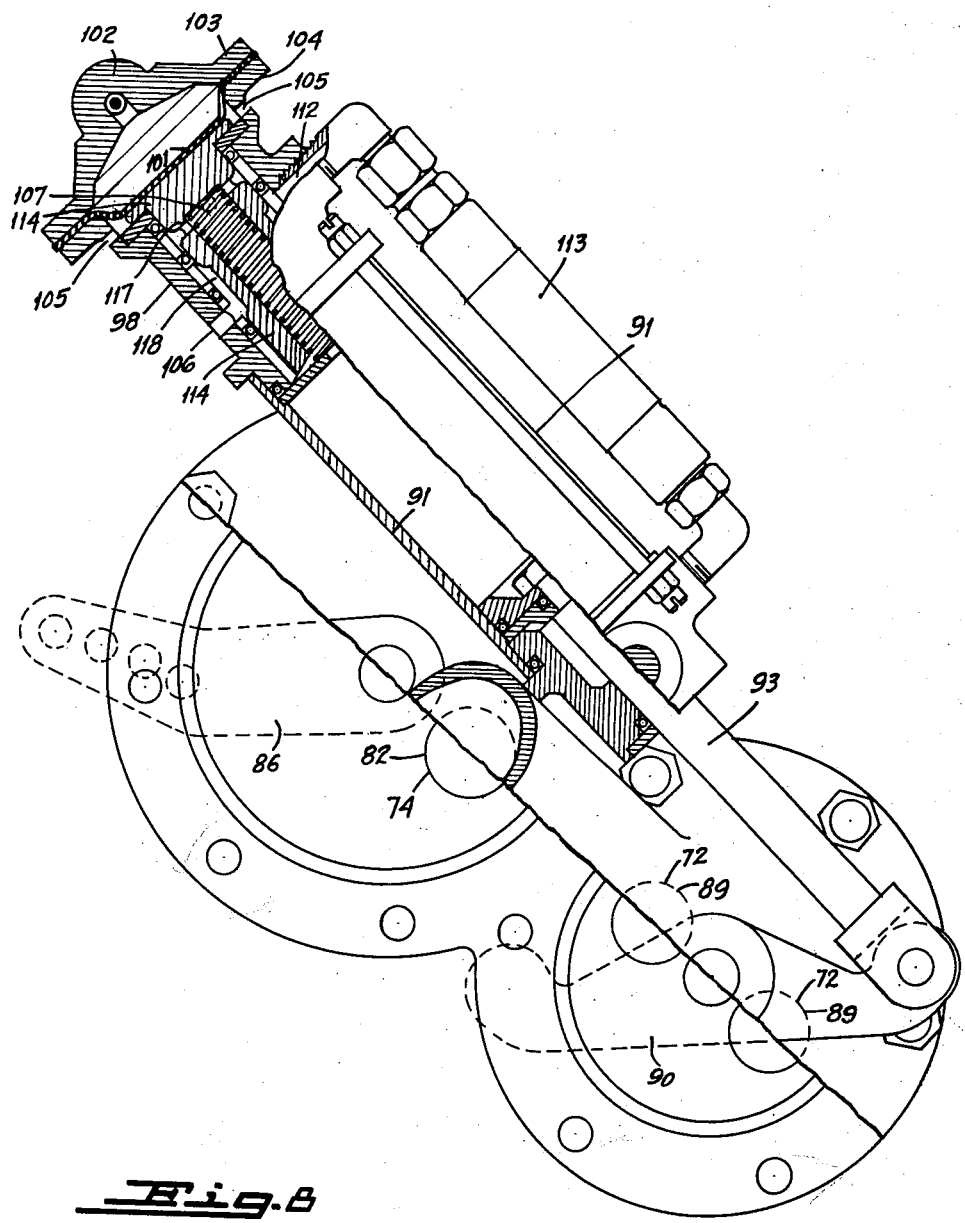
FIGURE 8 is a side view, partly in section, of the control air cylinder as shown in FIGURE 7, with the piston and levers for operating the discs of the blast valve manifold unit shown for the open position of the valves in said unit.

Taking up next a description of the control air cylinder and eductor for operating the blast valve manifold unit, an air cylinder 91 (FIGURE 9, also FIGURES 7 and 8), which is designated generally as 62 in FIGURE 5, is provided with a piston 92 and piston rod 93, which rod extends sealably and slidably through the lower end closure of said cylinder and is pivotally mounted at its lower end by clevis 94 (FIGURE 9) to one end of blast-air valve lever 90, which lever as hereinbefore mentioned is rigidly secured at its mid section to blast-air valve stem 87 of the blast valve manifold unit. The said air cylinder is closed at its upper end by plate 95 provided with an axial opening or port 96. At the lower end of the said air cylinder a radial port 97 extends through the side wall of the cylinder. A cylindrical valve housing 98 is positioned coaxially with respect to air cylinder 91 and is mounted to the upper end of said air cylinder, bolts 99 partly shown in FIGURE 7 serving as a means for securing said valve housing to said air cylinder. The upper end of the cylindrical valve housing 98 is formed into a flange 100 across which is positioned diaphragm 101 which closes the upper end of said valve housing. An eductor 102 (of the same type as eductor 28 in the system shown in FIGURE 1), which is designated generally as 61 in FIGURE 5, is mounted across the top of valve housing 98 (FIGURE 7), one side of the eductor body being formed into a circumferential rim 103 whose edge is sealably secured by any suitable means such as by screws 104 (FIGURE 9) to the flange 100 of said valve body, the said diaphragm being held firmly between said flange and said rim, the said rim together with the eductor body enclosing a space above said diaphragm which is in communication with the suction zone (zone of entrainment) of said eductor. At the upper end of valve housing 98, just below flange 100, a pair of exhaust ports 105 (seen in FIGURES 8 and 9) extend through the wall of the valve housing 98. The valve housing at these ports 105 is formed so that a space adjacent the said ports exists between the wall containing the said ports and the valve plunger 116 (later described), which space extends upwardly to the diaphragm 101. Thereby, with the diaphragm and valve plunger in their uppermost position, the ports 105 are in open communication with the diaphragm as shown in FIGURE 9, but are not open through to the diaphragm when the plunger is in its lowermost position as shown in FIGURE 8. Another exhaust port 106, seen also in FIGURES 8 and 9, extends through the wall of the valve housing 98 at about its lower one-third section. An entrance port 107 (seen in FIGURE 7) leads through the wall of valve housing 98, the wall of the valve housing together with flange 100 being formed into a lug 108 at this point which is drilled and threaded to receive a hose connector 109 to which is connected the aforesaid flexible hose line 63 shown in FIGURE 5 which conveys compressed air to the said entrance port 107. The lug 108 is also drilled with a hole 110 (FIGURE 7) which branches from entrance port 107 and communicates through a hole 111 in the eductor rim 103 with the intake to the eductor 102, thus providing for compressed air to be fed to the said eductor. The position of this entrance port 107 is indicated in FIGURES 8 and 9 by the dotted circle 107 (since the view in FIGURES 8 and 10 is the side view of that shown by FIGURE 7). Another entrance port 112 (FIGURE 9, also FIGURE 8), serving sometimes as an exit port, extends through the wall of valve housing 98 and communicates with conduit 113 alongside the air cylinder 91, which conduit in turn communicates with the aforesaid port 97 through the cylinder wall at the lower end of air cylinder 91. The position of this port 112 is indicated in FIGURE 7 by the dotted circle 112.

A valve plunger 114 (FIGURE 9, also FIGURES 7 and 8) fits slidably within valve housing 98, a number of valve sealrings 115 being provided between said plunger and the inner wall of cylindrical valve housing 98. The upper end of the said valve plunger is secured to the diaphragm 101 so that as the diaphragm is moved upwardly and downwardly the valve plunger slides within the valve housing accordingly. The valve plunger has an axial bore extending from its lower end through most but not all of its length and a compression spring 116, positioned within said bore with its lower end against plate 95, exerts an upward force against the valve plunger.

It will be observed that the space within the valve housing 98 below valve plunger 114 and in the central bore of the valve plunger is, through the port 96 in plate 95, always in communication with that part of the air cylinder 91 above the piston 92.

The valve plunger 114 is provided with two port passageways grooved circumferentially in its outer cylindrical surface. An upper such port passageway 117 (FIGURE 9) is so positioned that when the diaphragm and valve plunger are in their uppermost position it is in engagement with the upper exhaust port 105 through the wall of the valve housing. This port passageway 117 is (as will be seen on the right hand section of the valve plunger shown in FIGURE 9) in communication (through suitable drilling in the valve plunger) with the central bore of the valve plunger. (The fact that port 117 is in communication with the said central bore is also seen in FIGURE 8, although in that view the plunger is in its lower position.) Thus, with the diaphragm 101 in its uppermost position, that part of air cylinder 91 above the piston 92 is in communication with the outside atmosphere through the said central bore of the valve plunger, thence through port passageway 117 and exhaust port 105. A wider port passageway 118 (FIGURES 8 and 9) is grooved in the outer cylindrical surface of valve plunger 114 but is not in communication with the central bore of the valve plunger 114. It is so positioned that when the diaphragm and valve plunger are in their uppermost position it is in engagement with entrance port 107 (leading from air supply line 63) as seen from FIGURE 10 wherein the dotted circle 107 representing said entrance port is on a level with the upper portion of the said wide port passageway 118. The width of this port passageway 118 is essentially equal to the distance, axially with respect to the valve plunger, from the upper edge of entrance port 107 to the lower edge of port 112, and by reason of this fact, when the port passageway 118 is in engagement with entrance port 107 it is also in engagement with port 112, said port 112 as aforesaid being in communication, through said conduit 113, with the lower end of air cylinder 91. When the diaphragm 101 and valve plunger 114 are in their lowermost position the port passageway 118 is below and out of engagement with air supply port 107, as seen in FIGURE 7, but by reason of its above described width it is still in engagement with port 112 (dotted circle 112 is level with upper edge of port passageway 118 in FIGURE 7), which port 112 communicates through side conduit 113 with the lower end of the air cylinder 91. In fact, passageway port 118 is always in engagement with the said port 112, either at its upper or lower edge. Also, in this lowermost position of the valve plunger the port passageway 118 has been moved into engagement with the lower exhaust port 106 (FIGURE 8) so that the lower end of air cylinder 91 (below the plunger 92) is now in communication with the outside atmosphere (through port 97, side conduit 113, port 112, port passageway 118 and exhaust port 106), the exhaust port 106 being positioned accordingly. Moreover, in this lowermost position of the valve plunger the compressed air supply port 107 is now in communication with grooved passageway port 117 (FIGURE 7) which latter, by reason of appropriate drill holes in the valve plunger as aforesaid, is in communication with the central bore of the valve plunger, so that the compressed air pressure from the supply line 63 extends through the valve plunger and into the upper part of the air cylinder (above piston 92).

It has hereinabove been pointed out that the piston rod 93 of control air cylinder 91 is pivotally connected to one end of blast air valve lever 90, that said lever is rigidly attached at its mid section to blast air valve stem 87, and that abrasive blast lever 86 is rigidly attached at one end to abrasive blast valve stem 79 (FIGURE 9, also FIGURE 8 and FIGURE 6); also, as will be seen from FIGURE 6, that valve stem 79 is rigidly secured to valve disc 81 and valve stem 87 to valve disc 88. A linkage rod 119 (FIGURE 9) pivotally connects the free end of lever 90 to the free end of lever 86, with the axes of the two levers approximately parallel when thus connected. Multiple holes 120 are provided in the end of lever 86 whereby the lever 86 may be set at different angles to lever 90 in order that the opening through the abrasive valve ports 74 and 82, when valve disc 81 is rotated to a position of the engagement of these two ports, may if desired be varied. The relation of the said levers, valve discs and valve ports to each other and to the piston rod 93 of control air cylinder 91 is such that when the piston 92 is in the upper part of cylinder 91, as shown in FIGURE 9, the air blast valve ports 72 and 89 are in non-engagement so that the air blast compartments of the blast valve manifold are closed, and that likewise the abrasive blast valve ports 74 and 82 are also in non-engagement so that the abrasive blast compartments of the blast valve manifold are also closed. Similarly, when the piston 92 is in the lower end of the cylinder 91, as shown in FIGURE 8, both the air blast valve ports 72 and 89 and the abrasive blast valve ports 74 and 82 are in engagement whereby both the air blast and the abrasive blast compartments of the blast valve manifold are open.

From the foregoing description of parts and their functions, it will be clear that the operation of my remote air-control system with my blast valve manifold unit and eductor assembly, as shown in FIGURE 5, is as follows: with the operator's hand control valve 22 open—which is the status in all these remote control systems for no blast stream issuing from nozzle 19—air is flowing through the eductor 61 (102 in FIGURES 7, 8, and 9) which creates a high degree of sub-atmospheric pressure above the diaphragm 101, whereupon the valve plunger 114 is moved to its uppermost position. Compressed air from the supply line 63 passes through port 107, thence through passageway port 118 (FIGURE 9), port 112, side conduit 113 and port 97 into cylinder 91. The piston 92 moves upwardly driving the air above it through port 96 into the central bore of valve plunger 114 from whence it passes through port passageway 117 and thence through port 105 to the outside atmosphere. The upward movement of the piston, through the levers 90 and 86, rotates valve stems 87 and 79, and their attached valve discs 88 and 81 (FIGURE 6), to close the ports in the blast valve manifold so that no blast stream is in operation. Conversely, when the operator desires to start the blasting operation he presses hand lever 22 to close control valve 23. Pressure backing up through the control line 21 into the eductor and thence down through its entrainment zone, forces diaphragm 101 together with valve plunger 114 to their lowermost position. Compressed air from supply line 63 passes through port 107 through the valve plunger passageway port 117 (FIGURE 7) to the central bore of the valve plunger, thence through port 96 to drive the piston downward in air cylinder 91, the air below the piston passing out through port 97, side conduit 113, port 112, valve plunger port passageway 118 (FIGURE 8) and thence to the outside atmosphere through exhaust port 106. The downward movement of piston 93 reverses the levers 90 and 86 to rotate the valve stems and their attached valve discs to open the ports in both the air blast compartment and abrasive blast compartment of the blast valve manifold and hence to start the blast stream.

In the modification shown in FIGURE 10, the air blast valve 120 and abrasive blast valve 121 are of the disc type wherein a plate across the valve is provided with valve ports and a disc is provided with corresponding ports and adapted to be rotated to bring the ports of disc and plate into engagement and non-engagement with each other on the same principle as in the blast valve manifold unit hereinabove described. Their levers 122 and 123 are operated by the piston rods of control air cylinders 124 and 125 respectively, said cylinders being appropriately hinged with respect to their associated valves. The air cylinders and their pistons are arranged so that air pressure fed through lines 126 and 127 operate the pistons in their downward stroke, the cylinders being appropriately vented below the pistons, while springs supply the force for the upward stroke of the pistons, one such spring 128 being shown for cylinder 124. The piston rods of the cylinders are appropriately hinged to the operating levers 122 and 123, respectively, of the two said valves. Air supply line 20 provides compressed air to the control air cylinders through branch lines 129 and 130, these said branch lines being provided with eductors, 131 and 132 respectively (shown only diagrammatically) which are of the same type as the eductor 28 of FIGURE 1 hereinbefore described and the eductor in the system shown in FIGURE 5, the suction zone (zone of entrainment) of the eductors being connected to lines 126 and 127, respectively, leading to the two air cylinders. Beyond the eductors the lines 129 and 130 join to form the operator's control line 21. The operator's control valve 22, with its hand lever 23, and the blast hose 18 and nozzle 19 have the same functions as in FIGURE 1 and FIGURE 5 hereinbefore described.

In the operation of the system shown in this FIGURE 10, when the operator closes the control valve 22 by pressing lever 23 against the control line 21, the back pressure in line 21 and thence in lines 130 and 129 is exerted downwardly through the lines 127 and 126 leading from the zones of entrainment of eductors 132 and 131 to the air cylinders 125 and 124, whereupon the pistons are moved downwardly therein to open disc valves 121 and 120 and permit the blast stream to start in hose 18. This starting of the blast stream employs essentially the same operating principles as in the preceding systems. But when it comes to stopping the blast stream, which, it must be remembered, is always brought about by the release of this built-up pressure in the long control line, and where quick response is desired in order to ward off danger from an uncontrolled blast stream and whipping blast hose in case the operator accidentally loses control of the nozzle or rupture of the control hose 21 occurs, instead of waiting until the backed-up pressure has substantially all "bled out" through the long control line so the springs 128 may move the piston rods upward to close the air blast valve and abrasive blast valve, the eductors 132 and 131, upon the first increment of lowered back pressure, as hereinbefore explained in connection with eductor 28 of FIGURE 1 and which takes place almost instantly, create a very substantial lowered pressure in the control air cylinders 125 and 124, whereupon the springs 128 operate the levers 123 and 122 to close the valves immediately and shut down the blast stream systems.

While in the application of my invention to a sand blasting type of operation I have described a system wherein the air blast and abrasive blast valves are shut off by the operator opening his control valve so as to permit air flow through the control air line, in other words a system in which the air blast stream is stopped by starting the control air flow and started by stopping the control air flow, it will be apparent that in an operation wherein safety can otherwise be maintained the reverse type of control may, if desired, be employed, i.e., the triggering and control mechanism can be so arranged that closing the operator's control valve to stop the control air flow shuts the blast stream valves, and opening the operator's control valve to start the control air flow opens the blast stream valve. Both types of control are embraced within my invention.

As stated in the foregoing description, the air blast valve 13 and the abrasive blast valve 15 shown in the control system of FIGURE 1 are of conventional diaphragm type, and it is therefore not deemed necessary to show drawings of them. They have a fluid chamber within the valve housing, one side of which chamber is the valve diaphragm. An air supply conduit leads from a source of fluid pressure, usually compressed air, to said fluid chamber, and the pressure of the fluid from such conduit against this diaphragm moves the diaphragm so that the valve closure member, positioned on the opposite side of the diaphragm is moved against the valve seat to close the valve. The greater area of working surface on the fluid-chamber side of the diaphragm, as hereinabove stated, permits the closing of the valve with the air pressure of the blasting system; or, when desired, the conduit leading to the fluid-chamber side of the diaphragm may carry fluid under a different pressure. To open valves of this type means is provided by which the fluid is vented from the fluid-chamber side of the diaphragm.

Likewise, the air blast valve 122 and the abrasive blast valve 121 of the control system of FIGURE 10, which are of the disc type, are of conventional design and it is not deemed necessary to show their construction by drawings. They contain a movable, perforated disc-like plate rotatably positioned upon another perforated plate which constitutes a partition between compartments within the housing of the valve, and the movable plate is rotated to one position for the alignment of perforations in said plates to open said valve, and to another position to place said perforations out of alignment to close said valve. Affixed to the rotatable plate is a valve stem which extends through the housing of the valve. A suitable lever or other mechanical linkage is secured to the outer end of the valve stem by which the desired rotation of the movable plate is effected.

While I have shown a preferred form of my invention, it is to be understood that various changes may be made in its construction without departing from the spirit of the invention as defined in the appended claims.

I claim:

1. In a remote control apparatus for a mechanical activator having an air-tight chamber, one wall of which is movable in one direction with an increase in fluid pressure in said chamber and in the opposite direction with a decrease in fluid pressure in said chamber, the combination therewith of a conduit, a source of compressed air connected to one end of said conduit, a control valve in said conduit for selectively connecting and disconnecting said conduit to the atmosphere, a jet educator interposed in said conduit between said compressed air source and said control valve, said jet eductor having its jet bore and its eductor tube bore of small diameters adapted to create a high vacuum by the movement therethrough of a small volume of air under pressure, said eductor having a suction zone connected by an air-tight passageway to said air-tight chamber, to accelerate said movable wall inwardly when said control valve is opened.

2. In a system for an air-abrasive blast operation having a source of compressed air, an air blast line leading therefrom to carry an air blast stream, said line terminating in a blast nozzle, a source of abrasive with a passageway leading therefrom connected to said air blast line, means associated with said passageway for introducing abrasive into said air blast stream, and a blast stream valve in said air blast line, said blast stream valve being of the diaphragm type having a fluid chamber within the valve housing one side of which is a first diaphragm to which is connected the closure member of said valve, and a fluid carrying passageway leading from without said valve housing into said fluid chamber, the combination therewith of a remote control apparatus therefor comprising: an air-tight chamber, one wall of which is a second diaphragm movable in one direction with an increase in fluid pressure in said air-tight chamber and in the opposite direction with a decrease in fluid pressure in said air-tight chamber; a conduit; a source of compressed air connected to one end of said conduit; a control valve in said conduit for selectively connecting said conduit to the atmosphere; a jet eductor interposed in said conduit between said compressed air source and said control valve; said eductor having a suction zone connected by an air-tight passageway to said air-tight chamber to accelerate said movable second diaphragm inwardly when said control valve is opened; a housing secured to the periphery of said second diaphragm and extending therebelow to form a lower chamber; a vent through said housing connecting said lower chamber with the atmosphere; a downwardly extending hollow outer cylinder connected to the lower side of said last-named housing and leading from said lower chamber; an inner hollow cylinder axially slidably positioned in said outer cylinder and closed at both its lower and upper ends; a stem attached to the upper end of said inner cylinder extending upwardly through said lower chamber and secured at its upper end to said second diaphragm to be axially moved as said second diaphragm is moved; a first port through the wall of said outer cylinder and a conduit having one end fitted in said port leading from a source of compressed air; a second fixed port through the wall of said outer cylinder opposing said first fixed port and a conduit communicating between said second fixed port and said fluid-carrying passageway leading into said fluid chamber of said blast stream valve; a first movable port through the wall of said inner cylinder positioned to be moved into engagement with said first fixed port when said second diaphragm is moved inwardly with respect to said air-tight chamber; a second movable port through the wall of said inner cylinder, said second port being elongated to have greater axial length than said second fixed port and positioned so that its lower area is in engagement with said second fixed port when said first movable port is in engagement with said first fixed port; said greater axial length of said second movable port, and the length of said outer cylinder being such that when said inner cylinder is moved axially downwardly to put said first movable port out of engagement with said first fixed port, the upper area of said elongated second movable port is in engagement with said second fixed port and the lower area thereof is below the lower end of said outer cylinder to thereby put said second fixed port in communication with the atmosphere to permit release of the air pressure from said fluid chamber of said blast stream valve.

3. The apparatus of claim 2 with the addition of a spring in said lower chamber positioned to constantly urge said second diaphragm inwardly with respect to said air-tight chamber.

4. In a system for an air-abrasive blast operation having a source of compressed air, an air blast line leading therefrom to carry an air blast stream, said line terminating in a blast nozzle, a source of abrasive with a passageway leading therefrom connected to said air blast line, means associated with said passageway for introducing abrasive into said air blast stream, and a blast stream valve in said air blast line, said blast stream valve being of the diaphragm type having a fluid chamber within the valve housing one side of which is a first diaphragm to which is connected the closure member of said valve, and a fluid-carrying passageway leading from without said valve housing into said fluid chamber, the combination therewith of a remote control apparatus therefor comprising: an air-tight chamber, one wall of which is a second diaphragm movable in one direction with an increase in fluid pressure in said air-tight chamber and in the opposite direction with a decrease in fluid pressure in said air-tight chamber; a conduit; a source of compressed air connected to one end of said conduit; a control valve in said conduit for selectively connecting said conduit to the atmosphere; a jet eductor interposed in said conduit between said compressed air source and said control valve; said eductor having a suction zone connected by an air-tight passageway to said air-tight chamber to accelerate said movable second diaphragm inwardly when said control valve is opened, a three-way slide valve having a reciprocally slidable member and means associated therewith connecting said member to said second diaphragm; said slide valve having a first port and a second port; a source of compressed air; a conduit leading from said source of compressed air to said first port; a conduit communicating between said second port and said fluid-carrying passageway leading into said fluid chamber of said blast stream valve; said reciprocally slidable member being adapted to bring, in one of its reciprocal movements, said first port into communication with said second port to place said source of compressed air in communication with said fluid chamber of said blast stream valve, and, in its opposite reciprocal movement, to close said first port and bring said second port into communication with the atmosphere to release the compressed air pressure from said fluid chamber of said blast stream valve.

5. The apparatus of claim 4 with the addition of a spring in association with said second diaphragm and said reciprocally slidable ported member positioned to constantly urge said diaphragm inwardly with respect to said air-tight chamber.

6. In an air-abrasive blasting system, a remote control apparatus comprising: an air-tight chamber, one wall of which is a second diaphragm movable in one direction with an increase in fluid pressure in said air-tight chamber and in the opposite direction with a decrease in fluid pressure in said air-tight chamber; a conduit; a source of compressed air connected to one end of said conduit; a control valve in said conduit for selectively connecting said conduit to the atmosphere; a jet eductor interposed in said conduit between said compressed air source and said control valve; said eductor having a suction zone connected by an air-tight passageway to said air-tight chamber to accelerate said movable second diaphragm inwardly when said control valve is opened; said remote control apparatus being in combination with an air-abrasive manifold valve housing; a plate across said housing dividing the space enclosed therein into an upper and lower compartment; a partition member in said upper compartment dividing it into an abrasive-receiving chamber and a blast air-receiving chamber; a source of abrasive and a passageway connecting said abrasive source with said abrasive-receiving chamber; a source of blast air and a conduit connecting said blast air source with said blast air-receiving chamber; an air-abrasive blast line leading from said lower compartment and terminating in a hose provided with a nozzle; a port through said plate communicating between said abrasive-receiving chamber and said lower compartment and a port similarly communicating between said blast air-receiving chamber and said lower compartment; a valve disc rotatably slidably mounted flatwise on said plate in said abrasive-receiving chamber and having an opening therethrough, and a similar valve disc similarly mounted in said blast air-receiving chamber; a valve disc stem attached to each of said valve discs to rotate said discs, when said stems are rotated, to bring said openings through said discs into engagement and disengagement with the corresponding ports in said plate; said valve disc stems extending outwardly through said valve housing and being sealably rotatably mounted therein; spring means associated therewith constantly urging said valve discs against said plate; a lever rigidly secured to each of said valve disc stems outside said valve housing for rotating each said valve stem alternatively clockwise and counterclockwise when said levers are operated to and fro; a bar connecting said levers to maintain said levers in parallel relationship to each other; a cylinder fitted with a piston and piston rod; said piston rod being pivotally connected at its free end to one of said parallel levers; a source of compressed air for said cylinder and reciprocating slide valve means in association therewith for selectively admitting and exhausting said compressed air alternatively to and from said cylinder to operate said piston reciprocally; and means connecting the reciprocating member of said slide valve means to said diaphragm.

7. The apparatus of claim 6 with the addition of a spring positioned in association with said diaphragm to constantly urge said diaphragm inwardly with respect to said air-tight chamber.

8. In an abrasive blasting system which is started and stopped by remote control and which includes a source of compressed air, an air blast line leading therefrom to carry an air blast stream, said line terminating in a blast nozzle, a source of abrasive, a passageway leading therefrom connected to said air blast line together with means for introducing abrasive into said air blast stream, a remotely controlled blast stream valve in said air blast line, said blast stream valve being of the disc type which includes a perforated disc rotatably positioned in contact with a fixed perforated plate positioned across a valve housing, said disc having a valve disc stem rigidly secured thereto and sealably and rotatably extending through the valve housing, the rotation of said stem in one direction bringing said perforations into engagement with each other to open said valve, and in the opposite direction to disengage said perforations to close said valve, the combination therewith of a remote control apparatus therefor comprising an air-tight chamber one wall of which is a piston mounted in a cylinder and movable in one direction with an increase in fluid pressure in said air-tight chamber and in the opposite direction with a decrease in fluid pressure in said chamber; a conduit; a source of compressed air connected to one end of said conduit; a control valve in said conduit for selectively connecting said conduit to the atmosphere; a jet eductor interposed in said conduit between said compressed air source and said control valve; said eductor having a suction zone connected by an air-tight passageway to said air-tight chamber to accelerate said movable piston inwardly when said control valve is opened; an upper end closure to said cylinder to constitute the space within said cylinder above said piston the said air-tight chamber of said apparatus; a conduit connecting the suction zone of said eductor with said space in said cylinder above said piston; a piston rod attached to said piston; means by which said piston rod is axially slidably fitted through said upper end closure of said cylinder; a lever rigidly secured to said valve disc stem for the rotation of said stem; means pivotally connecting the end of said piston rod to the end of said lever; a spring in association with said piston rod and said cylinder constantly urging said piston toward the upper end of said cylinder; said cylinder being provided with a vent to the atmosphere at a point below the lowermost position of said piston during its operation; and means pivotally mounting said cylinder at its lower end to a rigid member of said system.

References Cited in the file of this patent
UNITED STATES PATENTS

| | | |
|---|---|---|
| 1,723,112 | Wolever | Aug. 6, 1929 |
| 2,314,580 | Garretson | Mar. 23, 1943 |
| 2,395,420 | Myers | Feb. 26, 1946 |
| 2,753,664 | Garver | July 10, 1956 |